March 15, 1938. E. J. JACOBSON 2,110,985
TIRE DETREADING KNIFE
Filed July 7, 1936
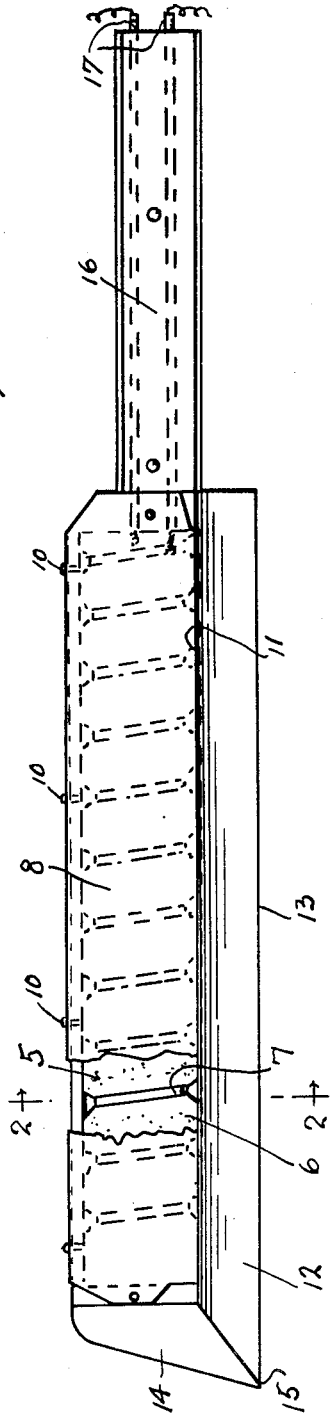
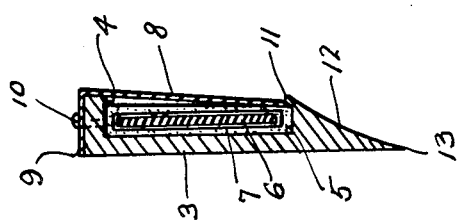
Inventor
E. J. Jacobson
By Clarence A. O'Brien
Hyman Berman
Attorneys Patented Mar. 15, 1938

2,110,985

UNITED STATES PATENT OFFICE 2,110,985

TIRE DETREADING KNIFE

Elliott Julius Jacobson, La Crosse, Wis.

Application July 7, 1936, Serial No. 89,360

1 Claim. (Cl. 219—21)

This invention relates to what is believed to be a new and novel tire detreading knife characteristic as a satisfactory tool for this special work in that it is provided with self-contained heating means.

It is a matter of common knowledge to those skilled in this particular line of endeavor that retreading pneumatic automobile tires is no longer in the experimental stage. Reliable and satisfactory retreading processes and structures make it possible to satisfactorily trim off the old treads down to the cords or carcass and to thereafter bake on an entirely new tread. The present invention has nothing to do with the retreading procedure, but concerns itself only with the adequate and satisfactory removal of the old worn tread in order to adapt the casing for complete retreading.

In the trimming off of this tread the work can be done either by a machine which is on the market, the price of which is almost prohibitive to the small shop, or it can be done by hand, a slow process under the present methods of doing it. When it is done by hand an ordinary knife about 12 to 14 inches long is used. The difficulty encountered in the use of an ordinary knife is that the rubber sticks to the knife. The knife must be dipped in water very often to prevent the rubber from sticking to it. Furthermore, rubber is quite difficult to cut with a knife, in that it dulls the knife very rapidly. Thus, much time is lost by repeated sharpening of the knife.

The preferred embodiment of the invention has to do with an electrically heated knife provided with regulation plug means whereby it may be conveniently supplied current on the premises.

Briefly, the improved, electrically heated, tire detreading knife comprises an appropriately designed blade characterized by an efficiently operating cutting edge, a reliable insulated handle, and a renewable electrically operated heating unit.

Other features and advantages will become more readily apparent from the following description and drawing.

In the drawing, wherein like numerals are employed to designate like parts throughout the views:

Figure 1 is an elevational view with a portion of the cover plate broken away and shown in a manner to partially expose the electrically heated core or filler unit.

Figure 2 is a transverse or cross-sectional view taken approximately on the plane of the line 2—2 of Figure 1.

The blade of the knife is generally constructed so that it is about 2½ inches wide and from 12 to 14 inches long. It is preferably constructed of a single body of properly tempered steel, being somewhat rectangular in general outline. One side, as indicated in Figure 2, and denoted by the numeral 3, is smooth and flat throughout its transverse dimension. The other side is formed with a longitudinally elongated recess 4 which is in effect a cavity or pocket to accommodate the electric heating element 5. This unit or element is of any suitable construction and generally includes an appropriate core 6 and winding 7. Incidentally, the particular construction of the electrical heating element is of no particular moment. It is important, however, that it be removably arranged in the open-sided pocket 4 so that it can be renewed from time to time. It is held in working position in the pocket through the instrumentality of a removable cover plate 8 having a laterally directed attaching and retaining flange 9 secured to the upper edge of the blade by a fastening as indicated at 10. The lower edge of the cover plate rests in a longitudinal or horizontal groove defined by an upstanding or laterally projecting guard lip 11. The knife portion constituting the blade proper, as shown in Figure 2, is generally V-shaped in cross-sectional form being flat on one side and tapering on the other side with a slight curvature so as to provide the desired concavity 12. The cutting edge, which is tapered to requisite fineness, is indicated at 13. The left hand end of the blade includes a somewhat trapezoidal extension 14 merging into the blade to form a penetrating point 15. This pointed configuration comes in handy in certain manipulating operations more readily ascertained from actual experimentation and use. The handle which is attached to the opposite end is indicated at 16 and is constructed of suitable heat-resisting insulating material, such as a composition of asbestos.

The gist of the invention is in the provision of an electrically heated knife having the insulated handle 16 at one end constructed to accommodate current supply wires 17 connectible with an appropriate wall or floor plug member (not shown), these wires being connected in turn with the removable or renewable electric heating unit 5. The unit 5 is arranged in a pocket formed in the body portion of the blade and held in place by an easily removable cover plate. The cover plate is novel in that it is securely retained in position by the laterally directed lip 11 and attaching flange 9. The blade itself is novel in that it is flat on one side to render it satisfactorily useful, and provided with an appropriate point 15 and beveled cutting edge 13. The heat prevents the rubber from sticking to the knife. This eliminates one difficulty. Secondly, the heat melts the rubber, which means that the rubber is more easily severed and cut off. Cutting off the old treads with this knife makes the work much easier and saves considerable time.

It is thought that the description taken in connection with the drawing will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

In a tire detreading knife of the class described, a handle-equipped blade having a hollow ground cutting edge and provided in one side thereof and laterally inwardly of the cutting edge with a cavity forming a pocket, said blade having a lip defining a longitudinal groove at the inner adjacent edges of the pocket and the cutting edge, a renewable electric heating element arranged in said pocket, and a detachable cover plate carried by the blade and covering the open side of the pocket to hold the electric heating element operatively in place, said cover plate being separably fastened at its outer end to the back of the blade and having its inner end seated in said groove.

ELLIOTT J. JACOBSON.